March 10, 1964                J. E. THOMAS                    3,124,068
FLEXIBLE ELECTROTYPE PRINTING PLATE
AND METHOD OF MANUFACTURE
Filed June 25, 1962
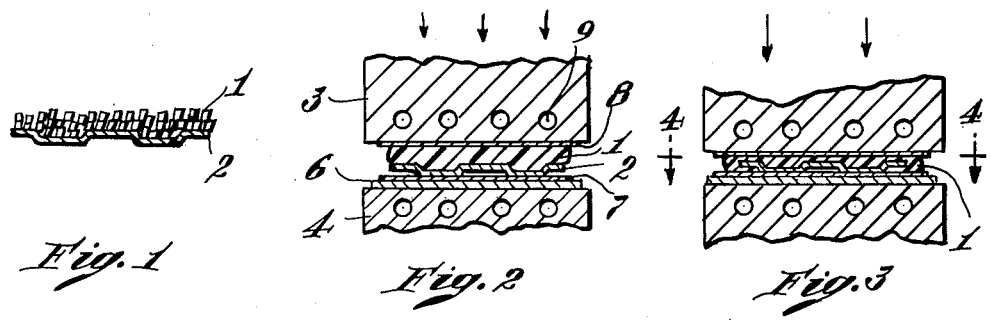
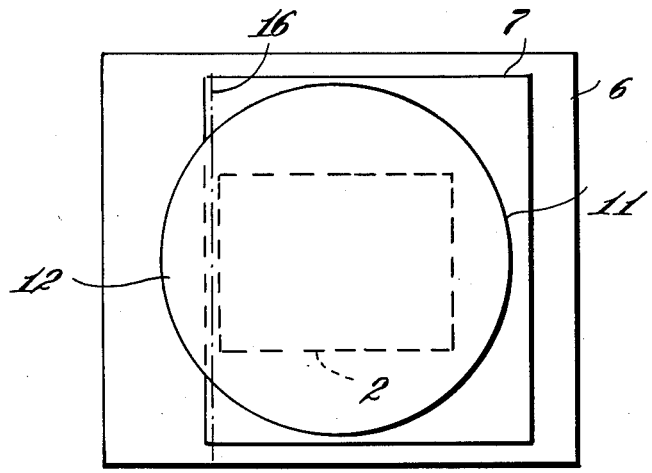
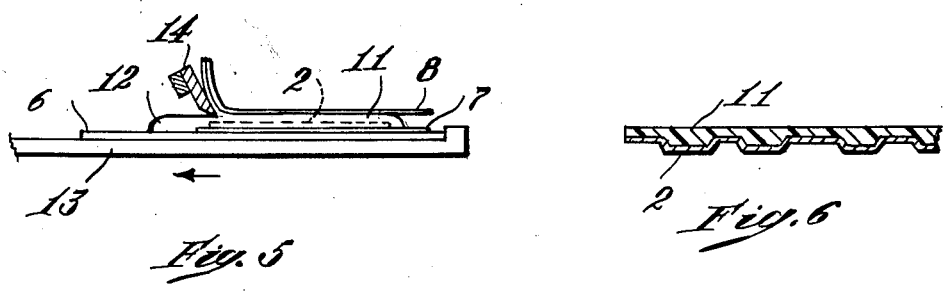
INVENTOR.
James E. Thomas
BY
Roberts, Cushman & Grover
ATT'YS

United States Patent Office 3,124,068
Patented Mar. 10, 1964

3,124,068
FLEXIBLE ELECTROTYPE PRINTING PLATE AND METHOD OF MANUFACTURE
James E. Thomas, Winchester, Mass., assignor of one-half to New England Electrotype Co., Cambridge, Mass., a corporation of Massachusetts, and one-half to Clyde H. Thomas Trust, Oswego, N.Y.
Filed June 25, 1962, Ser. No. 205,041
3 Claims. (Cl. 101—401.1)

In manufacturing electrotype printing plates it is customary to form a so-called shell having raised characters on its face and corresponding recesses in its back. The shell is usually formed of metal by electrical deposition in a mold. After the shell is formed the back is covered with a layer of material which fills the aforesaid recesses and stiffens the plate. After the backing is applied to the shell it is customary to skive the backing to make it uniform in thickness throughout its entire area, except for the portions in the aforesaid recesses. For this purpose it has been necessary to make the plate thick enough and stiff enough to be pushed through a skiving machine.

Objects of the present invention are to produce an electrotype printing plate which is flexible enough to be repeatedly curved for use on a curved press and straightened again for use on a flat press. Other objects are to provide a method of manufacture which is simple and economical and which can be performed rapidly and efficiently. Another object is to provide an improved method of skiving a plate which is too thin and flexible to be pushed through a skiving machine.

In one aspect the invention comprises a method of applying the aforesaid backing to a shell by covering the back of the shell with particles of thermoplastic material, subjecting the covered shell to heat and pressure to fuse the particles and fill the recesses in the back of the shell with the fused material and form a layer of the material over the back of the shell, and skiving the layer to uniform thickness. Preferably the thermoplastic material is fused under light pressure before it is fully compressed.

In another aspect the invention involves the method of backing a shell which comprises covering the shell with thermoplastic material, fusing the material, subjecting the fused material to pressure to fill the recesses in the back of the shell and form a layer of the material which has a portion extending beyond one edge of the shell, and with the aforesaid portion pulling the plate through a skiving machine to reduce the backing layer to uniform thickness. The preferred embodiment is characterized by placing the shell on a support which extends beyond the edges of the shell, the support being covered with protective sheet material or coating beyond the aforesaid edges except at one edge, covering the back of the shell with thermoplastic material, fusing the material, subjecting the fused material to pressure to fill the aforesaid recesses and form a layer of material which flows beyond the edges of the shell onto said sheet material and adheres to the aforesaid support beyond said one edge, with the support pulling the plate through a skiving machine to reduce the backing layer to uniform thickness, and removing the aforesaid material and trimming off the aforesaid portion. To prevent the fused material from adhering to the press a protective sheet is preferably interposed between the fusible material and the press.

In another aspect the invention comprises a flexible shell having raised printing surfaces on its front face and corresponding recesses in its rear face, the recesses being filled with nylon so that the plate may be used in either flat or curved form.

For the purpose of illustration a typical embodiment of the invention is shown in the accompanying drawings in which FIG. 1 is a cross section of a part of a shell with particles of thermoplastic material on the back thereof;
FIG. 2 is a section through a press while the thermoplastic material is being fused;
FIG. 3 is a similar section after the material has been fused and compressed;
FIG. 4 is a section on line 4—4 of FIG. 3;
FIG. 5 is a vertical section through a skiving machine; and
FIG. 6 is a section of a portion of a finished plate.

As shown in FIG. 1 particles 1 of nylon are placed on the back of a shell 2 and the covered shell is placed in a press comprising upper and lower parts 3 and 4. Underneath the shell 2 is placed a support 6. Between the shell 2 and the support 6 is a layer of paper 7 and over the nylon particles is a layer of paper 8, these layers serving to prevent the nylon from sticking to the support and press. The press 3—4 is provided with openings 9 through which steam or other heating fluid may be circulated. After the nylon has been fused as illustrated in FIG. 2 the press is closed as shown in FIG. 3 and the fused nylon is squeezed into the form of a pancake 11 (FIG. 4). The sheet of paper 7 extends beyond the edges of the shell 2 on three sides to prevent the fused nylon from sticking to the support 6 but the paper does not extend substantially beyond the left-hand edge of the shell (FIG. 4) so that the portion 12 of the pancake flows over the support 6 and adheres thereto.

After the fused nylon has cooled, the support 6 is fed through a skiving machine comprising a carrier 13 and a skiving knife 14 to skive the backing layer of nylon 11 to uniform thickness as shown in FIG. 6. The carriage 13 propels the support 6 and the support 6 pulls the shell 2 and backing 11 through the machine by virtue of the portion 12 adhering to the support 6.

After the backing has been skived to the desired thickness the shell and backing are detached from the support 6 by cutting the nylon along the line 16 after which the marginal portions of the paper 7 and pancake 11 are trimmed along the other three edges of the shell.

It should be understood that the present disclosure is for the purpose of illustration only and that this invention includes all modifications and equivalents which fall within the scope of the appended claims.

I claim:

1. In the manufacture of an electrotype printing plate, the method which comprises forming a shell having raised characters on its face and corresponding recesses in its back, placing the shell on a support which extends beyond one edge of the shell, covering said back with thermoplastic material, fusing the material, subjecting the fused material to pressure to fill said recesses and form a layer of the material a portion of which flows beyond said edge of the shell and adheres to said support, with said support pulling the plate through a skiving machine to reduce said layer to uniform thickness, and then trimming off said portion.

2. In the manufacture of an electrotype printing plate, the method which comprises forming a shell having raised characters on its face and corresponding recesses in its back, placing the shell on a support which extends beyond the edges of the shell, covering the support with protective material beyond said edges except at one edge, covering said back with thermoplastic material, fusing the material, subjecting the fused material to pressure to fill said recesses and form a layer of the material which flows beyond the edges of the shell onto said protective material and adheres to said support beyond said one edge, with said support pulling the plate through a skiving machine to reduce said layer to uniform thickness, and trimming the plate.

3. In the manufacture of an electrotype printing plate, the method which comprises forming a shell having raised characters on its face and corresponding recesses in its back, placing the shell on a support which extends beyond the edges of the shell, covering said back with thermoplastic material, fusing the material, compressing the aforesaid parts in a press to fill said recesses and form a layer of the material which flows beyond the edges of the shell and adheres to said support beyond one edge while preventing the fused material from adhering to the press by interposing protective material therebetween, with said support pulling the plate through a skiving machine to reduce said layer to uniform thickness, and trimming the plate.

References Cited in the file of this patent

UNITED STATES PATENTS

| | | |
|---|---|---|
| 1,803,548 | Drake | May 5, 1931 |
| 2,108,822 | Lippincott | Feb. 22, 1938 |
| 2,517,701 | Oettinger | Aug. 8, 1950 |
| 3,087,423 | Libberton | Apr. 30, 1963 |